(12) United States Patent
Wurth et al.

(10) Patent No.: US 11,155,170 B2
(45) Date of Patent: Oct. 26, 2021

(54) TRANSPORT SYSTEM

(71) Applicant: Schneider Electric Industries SAS, Rueil-Malmaison (FR)

(72) Inventors: Ruediger Wurth, Offenburg (DE); Joern Graewe, Aschffenburg (DE); Martin Stollberger, Waldbuettelbrunn (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 191 days.

(21) Appl. No.: 16/402,332

(22) Filed: May 3, 2019

(65) Prior Publication Data

US 2019/0344972 A1 Nov. 14, 2019

(30) Foreign Application Priority Data

May 8, 2018 (EP) .................................... 18171143

(51) Int. Cl.
| | |
|---|---|
| *B60L 15/00* | (2006.01) |
| *B60L 15/38* | (2006.01) |
| *H02K 41/02* | (2006.01) |
| *B65G 43/10* | (2006.01) |

(52) U.S. Cl.
CPC ............. *B60L 15/005* (2013.01); *B60L 15/38* (2013.01); *B65G 43/10* (2013.01); *H02K 41/02* (2013.01); *B65G 2203/0266* (2013.01)

(58) Field of Classification Search
CPC ........ B65G 43/10; B60L 15/38; B60L 15/005
See application file for complete search history.

(56) References Cited

U.S. PATENT DOCUMENTS

| | | | |
|---|---|---|---|
| 6,803,681 B2 | 10/2004 | Faizullabhoy et al. | |
| 6,850,992 B2 | 2/2005 | Heinrich et al. | |
| 6,876,107 B2 | 4/2005 | Jacobs | |
| 6,876,896 B1 * | 4/2005 | Ortiz .................. | B29C 66/8351 700/112 |

(Continued)

FOREIGN PATENT DOCUMENTS

| | | |
|---|---|---|
| CN | 206042228 U | 3/2017 |
| EP | 0 893 767 A2 | 1/1999 |

(Continued)

OTHER PUBLICATIONS

Extended European Search Report dated Oct. 16, 2018 in European Patent Application No. 18171143.3, 8 pages.

*Primary Examiner* — Thomas Randazzo
(74) *Attorney, Agent, or Firm* — Oblon, McClelland, Maier & Neustadt, L.L.P.

(57) ABSTRACT

The invention relates to a transport system, in particular to a multi-carrier system, comprising
  a central control;
  a plurality of drive units, wherein the drive units are coupled to the central control by means of a data link; and
  a plurality of transport elements that are movable by means of the drive units, wherein the central control is configured to communicate control commands to the drive units, with the control commands causing the drive units to make a movement of the transport elements in dependence on the control commands. The transport system in accordance with the invention is characterized in that at least two of the drive units, preferably all the drive units, receive the same control commands.

20 Claims, 1 Drawing Sheet

(56) References Cited

U.S. PATENT DOCUMENTS

| | | | |
|---|---|---|---|
| 7,176,648 B2* | 2/2007 | Choi | B29C 45/7666 |
| | | | 318/625 |
| 8,122,434 B2 | 2/2012 | Kostadinov et al. | |
| 8,996,161 B2* | 3/2015 | Wernersbach | B60L 5/32 |
| | | | 700/230 |
| 9,422,116 B1* | 8/2016 | Hase | B65G 43/10 |
| 9,802,507 B2 | 10/2017 | Clark et al. | |
| 9,847,742 B2* | 12/2017 | Suzuki | H02P 25/06 |
| 2004/0182683 A1 | 9/2004 | Bigelow et al. | |
| 2004/0195078 A1 | 10/2004 | Anderson et al. | |
| 2005/0258795 A1* | 11/2005 | Choi | B29C 45/7666 |
| | | | 318/625 |
| 2010/0295497 A1* | 11/2010 | Takamatsu | H02P 23/18 |
| | | | 318/671 |
| 2012/0236873 A1* | 9/2012 | Steindl | H04L 12/4035 |
| | | | 370/432 |
| 2013/0035784 A1 | 2/2013 | Wernersbach et al. | |
| 2013/0119897 A1 | 5/2013 | Wernersbach et al. | |
| 2013/0173868 A1* | 7/2013 | Leyrer | H04L 12/40013 |
| | | | 711/152 |
| 2013/0317675 A1* | 11/2013 | Kumazawa | G05B 19/4189 |
| | | | 701/19 |
| 2015/0083018 A1 | 3/2015 | Clark et al. | |
| 2017/0217460 A1 | 8/2017 | Huber et al. | |
| 2017/0225900 A1* | 8/2017 | Radak | B65G 43/00 |
| 2018/0176341 A1* | 6/2018 | Stefan | H04L 12/40176 |
| 2018/0276174 A1* | 9/2018 | Buesching | G06F 13/4265 |
| 2018/0281140 A1* | 10/2018 | Jaentsch | B65G 37/00 |
| 2019/0002206 A1* | 1/2019 | Rothe | B65G 37/005 |
| 2019/0255698 A1* | 8/2019 | Zeiner | B25J 5/02 |
| 2020/0255044 A1* | 8/2020 | Wernersbach | B60L 5/32 |

FOREIGN PATENT DOCUMENTS

| | | |
|---|---|---|
| EP | 1 309 920 B1 | 5/2003 |
| EP | 3 173 363 A1 | 5/2017 |
| EP | 3 202 612 A1 | 8/2017 |
| WO | WO 96/27544 A1 | 9/1996 |
| WO | WO 2004/067416 A1 | 8/2004 |

* cited by examiner

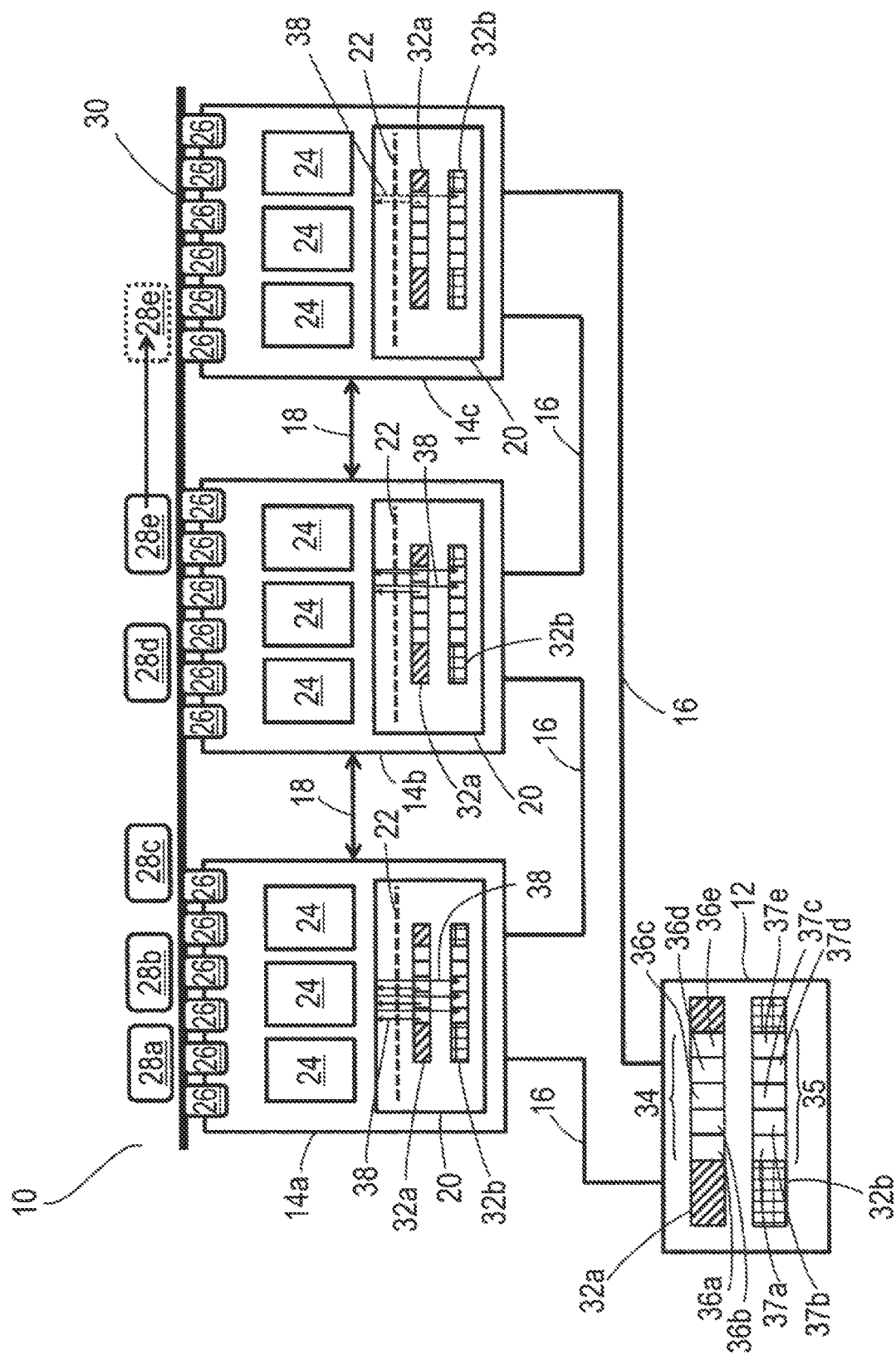

TRANSPORT SYSTEM

The present invention relates to a transport system, in particular to a multi-carrier system. The transport system comprises a central control and a plurality of drive units. The drive unis are coupled to the central control by means of a data link. The transport system additionally comprises a plurality of transport elements that are movable and/or moved by means of the drive units. The central control is configured to communicate control commands to the drive units, with the control commands causing the drive units to make a movement of the transport elements in dependence on the control commands.

In such transport systems, in particular in their configuration as multi-carrier systems, different transport elements can be moved by means of the drive units, preferably independently of one another. The independent movement of the transport elements makes it possible to adapt the transport system flexibly to different tasks. A flexibly adaptable industrial process can e.g. in particular be implemented by the transport elements movable individually and separately from one another.

Disadvantageously, individually controlling the transport elements is associated with a high effort and/or costs in conventional transport systems. It is, for example, known to establish a very large number of data paths between the central control and the drive units, with so many data paths being created that the theoretically maximum number of transport elements can be addressed in every drive unit. A data path is to be understood as a predefined route provided e.g. by a field bus for the transmission of data. Due to the large number of data paths, all of these data paths have to be kept free in the data link, whereby a high bandwidth of the data link is required or with a high bandwidth being permanently occupied.

It is equally known to connect a gateway between the central control and the drive units, with the gateway then allowing different control commands to reach the different drive units. In this procedure, the additional gateway must be implemented and provided, which can result in additional costs for the transport system.

It is therefore the underlying object of the invention to further develop a transport system of the initially named kind such that an inexpensive and simultaneously powerful transport system is provided.

This object is satisfied in accordance with the invention by a transport system in accordance with claim 1. The object is in particular satisfied in that at least two of the drive units, preferably a large number and/or the majority of the drive units, particularly preferably all of the drive units, receive the same control commands. This can, for example, mean that the drive units receive the same control commands.

The invention makes use of the recognition that the complex and/or expensive initial fixing of a high number of data paths can be avoided by the transmission of the same control commands to different drive units. It is instead e.g. possible in accordance with the invention that the drive units themselves only take the respective commands (e.g. control commands) relevant to them from the control commands and perform them. The drive units can therefore receive the same control commands at least at the hardware side. A substantial relief can hereby be achieved on the part of the central control such that the processing power of the central control can be considerably reduced and the central control can thus be designed considerably less expensively and/or can perform a faster processing.

It is likewise of advantage in accordance with the invention that a gateway can be saved that allows different control commands to be sent to the different drive units. The development costs for the gateway and for movement controls possibly included in the gateway can therefore be dispensed with.

The central control can be a higher ranking control, with in particular exactly one central control being present. The central control can specify by means of the control commands how the transport elements should be handled or how they are to be moved. The central control therefore generates the control commands, with the control commands being able to be transmitted to all the drive units by means of e.g. a broadcast.

The central control can in particular be a programmable logic controller (PLC). Different drive units can be connected to the PLC (by means of the data link).

A drive unit can, for example, comprise a linear motor, but also a rotary drive and the like. A drive unit preferably additionally comprises a processing device for data processing in which the received control commands are processed.

In particular those data exchanged between the central control and the drives that are intended to effect a movement of the transport elements are considered as control commands. Data sent back to the central control by the drive units such as status information, that is e.g. instantaneous positional information and/or instantaneous speed information on the transport elements are preferably not considered as control commands.

Advantageous further developments of the invention can be seen from the description, from the Figure, and from the dependent claims.

In accordance with a first advantageous embodiment, the control commands comprise commands for the movement of at least two transport elements. The drive units preferably process the control commands in dependence on a position of the transport elements. This means that the drive units process different commands from the control commands depending on where the transport elements are located. If, for example, transport element #1 is in the region of a first drive unit so that the first drive unit can move transport element #1, the first drive unit can perform the control commands that relate to transport element #1. If, in contrast, transport system #3 is in the proximity of the first drive unit and can thus be moved by the first drive unit, the first drive unit can instead, in particular only, carry out the control commands relating to transport element #3.

It must be mentioned in this connection that the control commands of the central control preferably indicate how a respective transport element should be moved and should not indicate how a respective drive unit should behave. The drive units preferably independently determine how the movement of the transport elements specified by the central control is to be implemented.

In accordance with a further advantageous embodiment, at least two of the drive units comprise a filter that filters commands, in particular only the commands relevant to the respective drive unit, from the control commands, with the relevant commands in particular relating to those transport elements that can instantaneously be moved by the respective drive unit. The filter can in particular be implemented by the above-named processing device of the respective drive unit. In this respect, only those commands are then transmitted or provided for processing by the filter that apply to transport elements that are actually in the region of the respective drive unit. The commands or control commands can in particular be indications on the desired position, desired speed, desired acceleration, etc. of a respective transport element.

The term filter can preferably be understood such that it is only important that the filter marks in some way which commands are relevant to the respective drive unit.

The filter can preferably be implemented in hardware specifically provided for this purpose, with e.g. the transport elements located in the region of the respective drive unit being stored in a memory map of the hardware provided. Such a hardware-embedded implementation of the filter makes it possible not to strain the processing device of the drive unit (that e.g. executes control software). The control software e.g. in particular never acquires knowledge of control commands that relate to transport elements not located in the region of the respective transport elements.

The transport elements can preferably be moved individually, separately from one another and/or independently of one another by means of the drive units.

In accordance with a further advantageous embodiment, the drive units are configured to initiate a change of the filter when a transport element is no longer movable by means of the respective drive unit and/or when a transport element is movable by means of the drive unit. In other words, the transport elements and/or their movement serve/serves as a trigger for the change of the filter. If therefore, for example, a transport element leaves the region of a first drive unit and enters into the region of a second drive unit, the filter of the first drive unit and the filter of the second drive unit can be changed at this point in time, in particular by an adaptation of the above-mentioned memory maps. The filter of the first drive unit then no longer considers control commands for the transport elements, whereas the filter of the second drive unit then considers control commands for the transport element, i.e. transmits them for processing.

In other words, "virtual" data paths can be created between the central control and the transport elements by the filters. The above-named filters and their change can then effect a dynamic reassociation of the data paths to the individual drive units without any action of the central control being required for this purpose or without a processing break of the transport system becoming necessary. A strain on the central control can be avoided in this manner, with a flexible and fast-responsive transport system nevertheless being provided.

The positions of the transport elements can be determined for the correct change or adaptation of the filters, for example via encoders (e.g. optical or magnetic) or by means of Hall sensors.

In accordance with a further advantageous embodiment, the drive units are configured to send status information on the transport elements back to the central control. The status information of at least two drive units and/or of at least two transport elements are preferably combined in a datagram. A datagram is, for example, to be understood as the Ethernet frame mentioned in the following.

The drive units can therefore send status information back to the central control. At least two drive units, preferably all the drive units, can here communicate status information to the central command with the same datagram. Alternatively or additionally, status information from at least two transport elements, preferably from all the transport elements, can be communicated to the central command by the same datagram.

The datagram that transmits the status information is preferably generated by the central control itself, then consecutively transmitted to the individual drive units and processed by the individual drive units (e.g. at least received on the hardware side there). The respective drive unit then inserts its status information into the datagram, where necessary. The diagram is then forwarded to the next drive unit. Finally, the datagram then again arrives at the central control that can in this manner receive all the status information in a single datagram. The strain on the data link can be greatly reduced by the use of a single datagram. The processing of the status information in the central control is also considerably simplified. The transmission of the status information to the central control preferably takes place repeatedly, e.g. cyclically.

The datagram for communicating the status information preferably does not comprise any control commands, i.e. the datagram for communicating the status information is separate from the transmission of the control commands.

In accordance with a further advantageous embodiment, the respective drive units are configured only to add status information on a transport element to the datagram when the transport element can instantaneously be moved by the respective drive unit, with the status information for a respective transport element preferably being stored at a predetermined position in the datagram.

In other words, the status information on a transport element is only inserted into the datagram by the drive unit when the respective transport element is located in the region of the drive unit.

The drive units preferably process control commands only when a respective transport element is located in the region of the drive unit. The same applies to the feedback channel, i.e. to the communication of status information to the central control. The filter explained above can thus be configured to act in two directions. On the one hand, only the relevant control commands are "transmitted" by the filter. On the other hand, the filter can ensure that only status information on transport elements that can be moved by the respective drive unit can be written into the datagram by the respective drive unit.

The status information for a respective transport element can be entered into the datagram at a position predetermined for this purpose (e.g. in a predefined region) by the predetermined position. The interpretation of the status information and the association of the status information with a respective transport element in the central command are hereby simplified.

In accordance with a further advantageous embodiment, there is a communication link between at least two of the drive units by means of which the drive units are preferably informed of and/or exchange knowledge of movements of the transport elements. Adjacent drive units can in particular inform one another that a transport element has left the region of the one drive unit and has thus transitioned into the region of the other drive unit. A synchronous switchover or change of the filters of the drive units can thereby be carried out by means of the communication link. It is hereby avoided that a control command is erroneously (on a non-synchronous switchover) processed by two drive units or by no drive unit at all. The communication link is preferably physically separate from the data link. In addition, the communication link can permit a faster data transfer between two drive units than the data link.

In accordance with a further advantageous embodiment, the data link is based on a fieldbus connection. The fieldbus connection can preferably provide a real time connection, for example by the use of Industrial Ethernet. The data link and/or the fieldbus can therefore each build on the Ethernet technology, with the control commands preferably being transmitted in Ethernet frames. The control commands for the drive units can preferably be transmitted a single or common Ethernet frame.

The fieldbus connection can in particular be an EtherCAT fieldbus, a PROFINET fieldbus, an Ethernet/IP fieldbus and the like. The communication link between the drive units can also be formed by a fieldbus. The communication link can also ensure a real time communication.

The data link and in particular the fieldbus connection can respectively connect the central control to a plurality of drive units, and preferably to all the drive units. The same data link or the same fieldbus connection is therefore used for the drive units or for all the drive units. The drive units automatically receive the same control commands in this manner.

In accordance with a further advantageous embodiment, the data link is based on the Sercos III fieldbus, with the filter in the drive units comprising a Sercos descriptor table that carries out an association of commands included in the control commands with transport elements located in the region of the respective drive unit. The Sercos descriptor table can therefore implement the function of the above-described filter. The Sercos descriptor table (i.e. the filter) can take the control commands from an Ethernet frame and can associate the data from the Ethernet frame with the transport elements located in the region of the drive unit. Control commands in the Ethernet frame that do not relate to transport elements located in the region of the drive unit can be masked by the filter. In a corresponding manner, the Sercos descriptor table can ensure that only status information on transport elements located in the region of the drive unit are transmitted to the central control, with it simultaneously being able to be ensured that the status information is transmitted at the correct predetermined position in the Ethernet frame (i.e. in the datagram).

In accordance with a further advantageous embodiment, at least two of the drive units respectively comprise a plurality of regulators, in particular cascaded regulators. Cascaded means that the respective regulator preferably comprises a positional regulator, a speed regulator and/or a power regulator. A respective one of the regulators preferably respectively carries out a regulation for one, in particular for exactly one, of the transport elements. The regulators can be implemented by means of software in the processing device. This means that the number of regulators can correspond to the number of transport elements movable at a maximum simultaneously by means of the respective drive unit. The drive units can in particular each comprise three or six regulators. The regulators can each have an identical design, whereby they are simple to implement.

In accordance with a further advantageous embodiment, the central control specifies a movement profile for at least two of the transport elements. The movement profile is preferably transmitted to the drive units by the central control by means of the data link. The movement profile can e.g. be generated by consecutively transmitted (e.g. in different Ethernet frames) speed values or by consecutively transmitted position values. An exact and precise movement of the transport elements is in particular made possible here by the use of a real time connection here.

In accordance with a further advantageous embodiment, the drive units are directly connected to the central control by means of the data link. This means that no data processing device which changes, distributes and/or converts the control commands is provided between the central control and the drive units. A gateway between the drive units and the central control can be saved in this manner.

In accordance with a further advantageous embodiment, the transport system is a multi-carrier system that comprises a plurality of transport elements movable independently of one another, with the transport elements being guided on a guide path and being moved along the guide path by means of the drive units, with the transport elements preferably being moved from one drive unit to the next. The drive units are preferably arranged along a guide path, in particular a contiguous guide path. The guide path can comprise a mechanical guide for the transport elements. The transport elements can, for example, have rollers that run in recesses of the guide path. The guide path of the transport system is in particular closed in itself so that the transport elements can be moved along a closed path (i.e. "in a circle").

In accordance with a further advantageous embodiment, the drive units comprise linear motors. This means that the drive units can comprise a plurality of coils (e.g. nine to twenty one, in particular eighteen) that generate a migrating magnetic field. In a corresponding manner, the transport elements can comprise permanent magnets, with the migrating magnetic field of the coils effecting a force on the permanent magnets of the transport elements so that the transport elements are moved along the guide path. In the case of a multi-carrier system, the transport elements can be so-called movers that have said permanent magnets.

The drive unit are preferably units closed in itself that comprise said coils, the processing device and/or corresponding power electronics to control the coils. The drive units are further preferably configured to be arranged in rows next to one another in modular form to form a transport path for the transport elements. The transport elements can then be moved along the transport path.

The drive units can additionally respectively comprises pieces of the guide path so that the pieces of the guide path together form the guide path on the joining together of a plurality of drive units. For example, a drive unit can comprise a piece of the guide path of a length of approximately 30 to 50 cm.

An energy supply, an Ethernet connector for the data link and/or a connector for the communication link can be present, can in particular only be present, as connectors for the drive units. The central control and the drive units can accordingly be arranged spatially spaced apart or separately from one another. This also applies to the drive units among themselves.

It is understood that the transport system in accordance with the invention is not restricted to a multi-carrier system. Instead, it is likewise possible to configure the transport system differently, e.g. with drive units that are configured as conveyor belts, with then, for example, workpieces or containers transported on the conveyor belt being considered as transport elements. The respective conveyor belt is in particular moved (in response to the corresponding control commands) when the respective workpiece lies on the respective conveyor belt.

A further subject matter of the invention is a method of controlling a transport system, in particular a multi-carrier system, wherein the transport system comprises a central control, a plurality of drive units, and a plurality of transport elements. The drive units are coupled to the central control by means of a data link. The transport elements are moved by means of the drive units. The central control here communicates control commands to the drive units, with the control commands causing the drive units to make a movement of the transport elements in dependence on the control commands. The method in accordance with the invention is characterized in that at least two of the drive units, preferably a large number and/or the majority of the drive units, particularly preferably all the drive units, receive the same control commands.

The above statements on the transport system in accordance with the invention apply accordingly to the method in accordance with the invention. This in particular applies to advantages and preferred embodiments.

The invention will be described in the following purely by way of example with reference to the drawing. There is shown:

FIG. 1 schematically, a multi-carrier system.

FIG. 1 shows a multi-carrier system 10 in a schematic view. The multi-carrier system 10 comprises a central control 12 and at least three drive units 14a, 14b, 14c.

The central control 12 is coupled to the drive units 14 by means of a Sercos III fieldbus 16 in a ring connection. In addition to the Sercos III fieldbus 16, the drive units 14 are each connected to adjacent drive units 14 by means of a communication link 18. The communication link 18 is configured to transmit data faster between two drive units 14 than is possible by means of the Sercos III field bus 16. The communication link 18 can, for example, require 125 µs, whereas the Sercos III fieldbus 16 can require 1 ms.

The Sercos III fieldbus 16 is configured such that every drive unit 14 receives all the real time data transmitted over the Sercos III fieldbus 16 and forwards them to the further drive units 14.

A respective segment controller 20 is arranged in every drive unit 14a, 14b, 14c. Each segment controller 20 has a filter 22 in the form of a Sercos descriptor table.

The drive units 14 additionally each comprise three regulators which control field coils 26 of the drive units 14 via power stages (not shown). The regulators 24 are in turn controlled by the respective segment controller 20.

A changeable and/or migrating magnetic field is generated by the field coils 26 by means of which so-called movers 28 (i.e. transport elements) can be moved on a guide path 30. The movers 28 comprise permanent magnets (not shown) for this purpose.

FIG. 1 shows a total of five movers 28, with a first mover 28a, a second mover 28b, and a third mover 28c being arranged in the region of the first drive unit 14a. A fourth mover 28d and a fifth mover 28e are in contrast located in the region of the second drive unit 14b.

In operation, the central control 12 now transmits Ethernet frames 32a, 32b cyclically over the Sercos III fieldbus 16. The Ethernet frames 32a, 32b here comprise either control commands 34 or status information 35.

The control commands 34 are divided within the Ethernet frames 32a into—here by way of example—five control command sections 36a, 36b, 36c, 36d, 36e. Each control command section 36 is here associated with a respective mover 28 and includes control commands for the respective mover. A first control command section 36a, for example, includes control commands for the first mover 28a.

In a corresponding manner, five predetermined status information sections 37a, 37b, 37c, 37d, 37e are e.g. arranged within another Ethernet frame 32b. A respective mover 28 is here also associated with each status information section 37, with e.g. the first status information section 37a being filled with status information on the first mover 28a.

The drive units 14 now know (e.g. by determining by means of an encoder, not shown) which movers 28 are located in the region of the respective drive unit 14. The segment controllers 20 of the drive units 14 adapt their filters 22 accordingly.

In operation, one Ethernet frame 32 having the same control commands 34 is now received from all drive units 14 (more precisely from the respective segment controller 20). It should be understood that only the control commands 34 are respectively identically received. Further data contained in the Ethernet frame 32a can in contrast be changed by the drive units 14.

The filter 22 is now set in the first drive unit 14a such that the control command sections 36a, 36b, 36c relevant to the three movers 28a, 28b, 28c located in the region of the first drive unit 14a are processed, which is indicated by processing arrows 38 in FIG. 1. It is effected by the processing that the regulators 24 in the first drive unit 14a e.g. carry out a movement of the movers 28a, 28b, 28c. The remaining control command sections 36d, 36e are not taken into account by the first drive unit 14a.

In a corresponding manner, only the control command sections 36d and 36e are forwarded by the filter 22 of the second drive unit 14b for processing since they belong to the movers 28d, 28e located in the region of the second drive unit 14b.

There are initially no movers 28 in the region of the third control unit 14c so that the filter 22 there initially does not initiate any processing of control command sections 36.

If now the fifth mover 28e is moved by the second drive unit 14b into the region of the third drive unit 14c, the second drive unit 14b communicates this to the third drive unit 14c by means of the communication link 18. The filters 22 of the second and third drive units 14b, 14c are thereupon changed. The execution of control commands for the fifth mover 28e is blocked in the filter 22 of the second drive unit, whereas the execution of control commands for the mover 28c is released for processing in the third drive unit 14c.

If the central control 12 now transmits a further command to move the fifth mover 28e in the control commands 34 (in the fifth control command section 36e), this command is automatically processed by the third drive unit 14c without the central control 12 thus being strained to set up or initialize a communication or a data path with respect to the respective drive unit 14. In this manner, the control of the multi-carrier system 10 becomes possible in a simple manner and thereby permits a flexible use of the multi-carrier system 10.

The sending back of status information 35 from the drive units 14 to the central control 12 takes place in a simple manner.

The Ethernet frame 32b for communicating the status information is first received by first drive unit 14a. The Ethernet frame 32b for communicating the status information in the use of the Sercos III fieldbus 16 is a different Ethernet frame 32 than the Ethernet frame 32a that communicates the control commands 34.

In the first drive unit 14a, the filter 22 is set such that the status information sections 37a, 37b, 37c for the three movers 28a, 28b, 28c located in the region of the first drive unit 14a are "filled" (i.e. written) by the first drive unit 14a, which is likewise indicated by the processing arrows 38.

In a corresponding manner, the remaining status information sections 37d, 37e are written by the second and third drive units 14b, 14c. Finally, the central control 12 receives the Ethernet frame 32b again and thus obtains the complete status information 35 that was determined without the necessity of a high transmission bandwidth of the fieldbus 16.

REFERENCE NUMERAL LIST 10 multi-carrier system
12 central control 14a-14c drive units
16 Sercos III fieldbus
18 communication link
20 segment controller
22 filter
24 regulator
26 field coil
28a-28e movers
30 guide path
32a, 32b Ethernet frame
34 control command
35 status information
36a-36e control command section
37a-37e status information section
38 processing

The invention claimed is:

1. A transport system comprising:
a central control;
a plurality of drive units, wherein the drive units are coupled to the central control by means of a data link; and
a plurality of transport elements that are movable by means of the drive units,
wherein the central control communicates control commands to the drive units, with the control commands causing the drive units to make a movement of the transport elements in dependence on the control commands, and wherein at least two of the drive units receive the same control commands.

2. The transport system in accordance with claim 1, wherein the transport system is a multi-carrier system.

3. The transport system in accordance with claim 1, wherein all the drive units receive the same control commands.

4. The transport system in accordance with claim 1, wherein there is a communication link between at least two of the drive units.

5. The transport system in accordance with claim 1, wherein the data link is based on a fieldbus connection.

6. The transport system in accordance with claim 1, wherein the data link is based on the Sercos III fieldbus, with the filter in the drive units comprising a Sercos descriptor table that carries out an association of commands included in the control commands with transport elements located in the region of the respective drive unit.

7. The transport system in accordance with claim 1, wherein at least two of the drive units respectively comprise a plurality of regulators, with a respective one of the regulators carrying out a regulation for one of the transport elements.

8. The transport system in accordance with claim 1, wherein the central control for at least two of the transport elements specifies a movement profile and transmits it to the drive units by means of the data link.

9. The transport system in accordance with claim 1, wherein the drive units are directly connected to the central control by means of the data link.

10. The transport system in accordance with claim 1, wherein the transport system is a multi-carrier system that comprises a plurality of transport elements movable independently of one another, with the transport elements being guided on a guide path and being moved along the guide path by means of the drive units.

11. The transport system in accordance with claim 1, wherein the drive units comprise linear motors.

12. The transport system in accordance with claim 1, wherein the drive units send status information on the transport elements back to the central control, with the status information of at least two drive units and/or of at least two transport elements being combined in a datagram.

13. The transport system in accordance with claim 12, wherein a respective drive unit is configured only to add status information on a transport element to the datagram when the transport element can currently be moved by the respective drive unit.

14. The transport system in accordance with claim 13, wherein the status information for a respective transport element is stored at a predetermined position in the datagram.

15. The transport system in accordance with claim 1, wherein the control commands comprise commands to move at least two transport elements, with the drive units processing the control commands in dependence on a position of the transport elements.

16. The transport system in accordance with claim 15, wherein at least two of the drive units comprise a filter that filters the commands.

17. The transport system in accordance with claim 16, wherein at least two of the drive units comprise a filter that filters only the commands relevant to the respective drive unit from the control commands.

18. The transport system in accordance with claim 17, wherein the relevant commands only relate to those transport elements that can instantaneously be moved by the respective drive unit.

19. The transport system in accordance with claim 16, wherein the drive units are configured to initiate a change of the filter when a transport element is no longer movable by means of the respective drive unit and/or when a transport element is movable by means of the drive unit.

20. A method of controlling a transport system, wherein the transport system comprises a central control; a plurality of drive units, wherein the drive units are coupled to the central control by means of a data link; and a plurality of transport elements, and wherein the transport elements are moved by means of the drive units, the method comprising:

communicating, by the central control, control commands to the drive units, with the control commands causing the drive units to make a movement of the transport elements in dependence on the control commands; and receiving, by at least two of the drive units, the same control commands.

* * * * *